July 5, 1955
E. J. GRACE, JR
2,712,641
SELECTIVE MEASURING SYSTEM
Filed Dec. 30, 1949
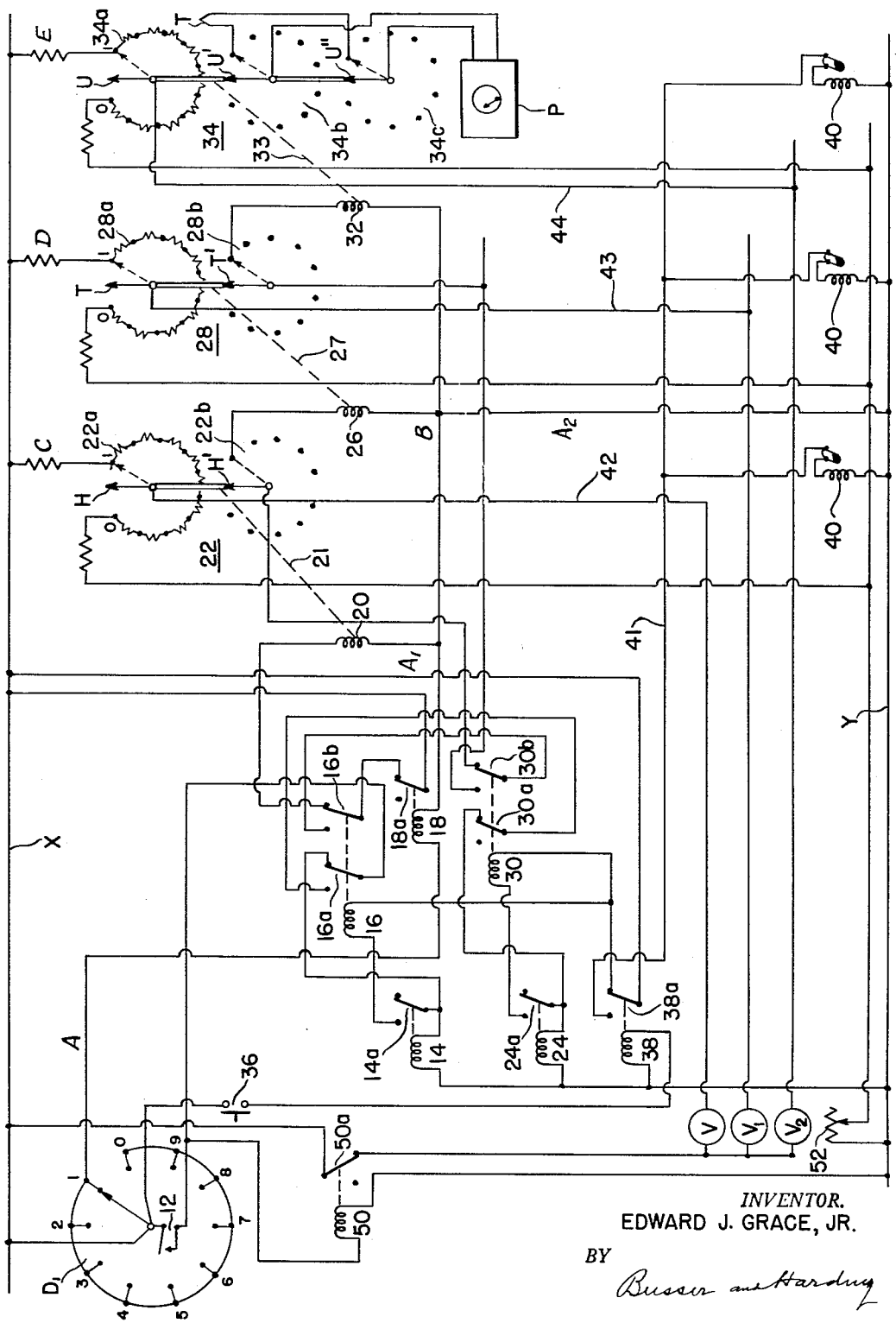
INVENTOR.
EDWARD J. GRACE, JR.
BY
*Busser and Harding*
ATTORNEYS

# United States Patent Office 2,712,641
Patented July 5, 1955

2,712,641

SELECTIVE MEASURING SYSTEM

Edward J. Grace, Jr., Swarthmore, Pa., assignor to Sun Oil Company, Philadelphia, Pa., a corporation of New Jersey Application December 30, 1949, Serial No. 136,017

3 Claims. (Cl. 340—150)

This invention relates to a system for selecting any one of a plurality of measurable variables and connecting the variable measuring apparatus to remotely located indicating and recording devices. The invention has particular utility in petroleum refinery operations wherein a plurality of temperature responsive devices, such as thermocouples, resistance thermometers or the like, are subjected to temperatures existing in the various units of a refinery. The system is so designed that the temperature of any selected one or plurality of thermocouples, for example, may be determined by an operator located in an instrument control room and the temperatures existing at the selected thermocouples will be sent back and indicated so that an operator may know by merely observing an indicating or recording device, the temperature of any selected thermocouple.

The invention is in the utilization of a well known telephone dial switch or other automatic switch which is connected in circuit with a plurality of selectors which are in turn placed in circuit with the various thermocouples existing around the refinery, some of which would be at great distances from the control room and the temperatures existing at the selected thermocouple would be sent back to an indicator or recorder in the control room. It is preferred to use three selectors in order that the temperature of a large number of thermocouples can be determined by simply using the dial. The particular arrangement presented in the instant application is designed so that three numbers must be dialed before any thermocouple is selected. It will be appreciated of course that the dial could be placed in circuit with one switch and the system used to indicate the temperature of ten thermocouples by dialing numbers 1 through 0 or that two selector switches can be connected in series and the temperature of up to 99 thermocouples could be determined and indicated in the control room. The present arrangement wherein it is necessary to dial three numbers is designed to indicate temperatures of from 001 to 999 thermocouples.

It is well known, of course, to use automatic switches, such as a dial telephone switch, to indicate the condition of instruments, for example, thermocouples, but the present invention provides an arrangement, in addition to indicating the temperature of the thermocouples, for sending back to the control room simultaneously with the determined temperature another record wherein is indicated the exact number which has been dialed. This feature of the invention is essential for proper operation, since if an operator intended to dial a particular number and dialed another number, or if because of some difficulty in the electrical connections of the system the number which the operator dialed was not properly placed in circuit with the dial switch, then this fact would be indicated. In other words, the system is arranged to be fool-proof in that any temperature which is indicated and recorded in the control room will have in association therewith the actual thermocouple which has been dialed.

The single figure of the drawing illustrates in part a standard arrangement of dialing system for making desired electrical circuits. Since this portion of the system shown in the figure is well known, it will be only briefly described immediately below. The reporting and indicating portion of the system on which the present invention is based, will be described in detail following the brief description.

Letter $D_1$ indicates a standard telephone dial mechanism. When a number is dialed in the usual manner, contact 12 is closed and relay 14 then becomes energized through contact 16a of normally deenergized relay 16 and contact 14a of the relay 14 is thereby closed. Normally the relay coil 18 is energized through the dial switch $D_1$, line A, point B and line $A_2$ connected between the power lines X and Y, but becomes deenergized intermittently when the dial returns to the zero position as the dial arm moves between the contact points of the switch $D_1$. The intermittent energization of the relay coil 18 in the first operation of the dial selector switch $D_1$ is effective to apply impulses to the impulse coil 20 of the hundreds selector 22, to correspond to the number which has been dialed. The circuit for this operation is from the power line Y, through line $A_2$, point B, line $A_1$, the relay coil 20, switch contact 16b of the normally deenergized relay 16, and the intermittently connected switch contact 18a to the power line X. The impulse coil 20 through a mechanical connection 21 advances switch arms H and H' of switches 22a and 22b respectively of the hundreds selector to contacts thereon which correspond to the number which has been dialed. The entire operation of the selector switch $D_1$ for consecutive actuation of the hundreds selector 22, tens selector 28 and units selector 34 is a conventional circuit arrangement well known in the telephone dial art.

When dial $D_1$ returns to rest position, contact 12 opens, energizing relay coil 16 in series with relay contact 14a operating contact arms 16a and 16b setting up circuit so that second digit may be dialed. When second digit is dialed contact 12 is again closed, this time energizing relay 24 which operates relay contact arm 24a. Impulse relay coil 18 is again interrupted when dial $D_1$ returns to rest position and applies the required number of impulses on the tens selector impulse coil 26 through hundreds selector switch 22b. Through mechanical connection 27, impulse coil 26 actuates arms T and T' to advance and make contact with the contact elements on switches 28a and 28b of the tens selector 28 which correspond with the second digit dialed.

When dial $D_1$ again returns to rest position, contact 12 opens and energizes relay coil 30 in series with relay coil 24 through relay contact 24a, operating relay contact arms 30a and 30b. Thus a circuit is set up for dialing the third digit.

Dialing the third digit again closes contact 12 but serves no purpose for this operation. Returning to rest position the dial interrupts current to impulse coil 18 sending the required number of impulses through units selector coil 32 from power line Y and point B to contact arm $T_1$ of tens selector switch 28, energized position contacts of switch 30, energized position contacts 16, and the intermittently operated contacts 18a of relay 18 to power line Y.

From the foregoing, it will be seen that three numbers have been dialed and that a thermocouple corresponding to the three numbers has been selected in order to obtain its temperature. Following this, the number of the selected thermocouple, as will be described later, will be transmitted back to the control room as well as the temperature existing at the thermocouple selected or dialed. In order to dial another number, the switch 36 is closed which energizes relay 38 causing contact arm 38a to break all holding circuits and energizes through line 41 all the release coils 40 which are in circuit with the power lines X and Y and control the selectors 22, 28 and 34.

Referring to the upper right hand portion of the drawing where selector switches 22a, 28a, and 34a are located, it will be seen that each of these switches in addition to the ten contact elements shown have resistors located between adjacent contacts with additional resistors C, D, and E positioned between the power line X and switches 22a, 28a and 34a, respectively placing each of the switches 22a, 28a and 38a in circuit between the power lines X and Y. In order to determine the number which has been dialed, a known voltage will exist between power lines X and Y through the switches 22a, 28a and 38a, and as the contact arms H, T, and U are moved over these switches respectively, there will be a voltage drop between power lines X and Y corresponding to the number of contacts that the switch arms H, T, and U have advanced. For example, if the voltage on each of the resistors of the switches is 1 volt, then the voltage drop would be equal to the number of contacts that the switch arms have traversed. As indicated in the drawing by the dotted line position of the switch arms, each of the switch arms H, T, and U, has advanced to contact number 1 and the voltage drop between the power lines X and Y on each of the switches 22a, 28a, and 38a, would be one volt. It will be noted that each of the switch arms H, T, and U, is in circuit with volt meters V, V1 and V2, respectively, through lines 42, 43, and 44, and each will have indicated thereon after three numbers are dialed the number of one.

From the voltage indicated on the volt meters V, V1 and V2, can be determined the number of contact elements on each of the switches 22a, 28a, and 38a, to which the switch arms H, T, and U, have been advanced. This will indicate to the operator the thermocouple which has been selected.

As mentioned before, when a number is dialed on switch D the contact plates 12 close and remain closed until the switch returns to its starting or rest position at which time it is opened. During the time the switch 12 is closed, the relay 50 is energized and opens switch 50a cutting off power to the volt meters V, V1, and V2. It will be seen from this that after a number has been dialed, and the switch 12 closed, that during the return of the dial to its position of rest, no current is supplied to the volt meters and thus no voltage will be recorded thereon until the dial switch has returned to its original position and the switch 12 opened de-energizing to return the relay 50 and switch 50a to closed position in order to supply current to the volt meters. The effect of this is to permit only one voltage to be recorded on each of the volt meters after a number has been dialed. An adjustable resistance 52 is provided in the circuit to the volt meters to permit balancing the current in the circuit.

As indicated, the thermocouple T or number 111, is in circuit with switches 34b, and 34c, of the selector 34, and also in circuit with the potentiometer P on which the temperature existing at the thermocouple T will be indicated.

It will be understood, of course, that the dial switch D, the volt meters V, V1 and V2, and the potentiometer will all be located in the control room of a refinery since it is the purpose of the invention to select stations in industrial operations, such as, thermocouples in a refinery from the control room and have the selected thermocouple and its temperature indicated in the control room.

I claim:

1. In combination, an electrical impulse transmitter, a first impulse-stepped switching device having a set of contacts, means connecting said transmitter to said first switching device to effect stepping of the latter by a first series of impulses from the transmitter, a set of second impulse-stepped switching devices each of which corresponds to one of said contacts and each of which has a set of contacts, means connecting said transmitter to any selected one of said second switching devices through a corresponding contact of the first switching device to effect stepping of said selected second switching device by a second series of impulses from the transmitter, sets of third impulse-stepped switching devices each of which corresponds to one of said contacts of the second switching devices, means connecting said transmitter to any selected one of said third switching devices through a corresponding contact of a second switching device to effect stepping of said selected third switching device by a third series of impulses from the transmitter, each of said third switching devices having contacts selected by its stepping, a measuring instrument connected to said third switching devices, and sensing means connected to the contacts of the third switching devices so as to be selectively connected to said measuring instrument upon stepping of any of said third switching devices.

2. In combination, an electrical impulse transmitter, a first impulse-stepped switching device having a set of contacts, means connecting said transmitter to said first switching device to effect stepping of the latter by a first series of impulses from the transmitter, a set of second impulse-stepped switching devices each of which corresponds to one of said contacts and each of which has a set of contacts, means connecting said transmitter to any selected one of said second switching devices through a corresponding contact of the first switching device to effect stepping of said selected second switching device by a second series of impulses from the transmitter, sets of third impulse-stepped switching devices each of which corresponds to one of said contacts of the second switching devices, means connecting said transmitter to any selected one of said third switching devices through a corresponding contact of a second switching device to effect stepping of said selected third switching device by a third series of impulses from the transmitter, each of said third switching devices having contacts selected by its stepping, a measuring instrument connected to said third switching devices, sensing means connected to the contacts of the third switching devices so as to be selectively connected to said measuring instrument upon stepping of any of said third switching devices, said first switching device comprising resistance means adjustable during its stepping, a first meter, means for energizing said first meter selectively in accordance with the adjustment of said resistance means to indicate the stepped position of said first switching device, each of said second switching devices comprising resistance means adjustable during its stepping, a second meter, means for energizing said second meter selectively in accordance with the adjustment of the resistance means of any selected one of said second switching devices to indicate the stepped position thereof, each of said third switching devices comprising resistance means adjustable during its stepping, a third meter, and means for energizing said third meter selectively in accordance with the adjustment of the resistance means of any selected one of said third switching devices to indicate the stepped position thereof.

3. In combination, an electrical impulse transmitter, a first impulse-stepped switching device having a set of contacts, means connecting said transmitter to said first switching device to effect stepping of the latter by a first series of impulses from the transmitter, a set of second impulse-stepped switching devices each of which corresponds to one of said contacts and each of which has a set of contacts, means connecting said transmitter to any selected one of said second switching devices through a corresponding contact of the first switching device to effect stepping of said selected second switching device by a second series of impulses from the transmitter, sets of third impulse-stepped switching devices each of which corresponds to one of said contacts of the second switching devices, means connecting said transmitter to any selected one of said third switching devices through a corresponding contact of a second switching device to effect stepping of said selected third switching device by a third series of impulses from the transmitter, each of said third switching devices having contacts selected by its stepping, a measuring instrument connected to said third switching devices, sensing means connected to the contacts of the third switching devices so as to be selectively connected to said measuring instrument upon stepping of any of said third switching devices, and remote electrically operated means for indicating the stepped position of said first switching device, the stepped position of the selected one of said second switching devices, and the stepped position of the selected one of said third switching devices.

References Cited in the file of this patent

UNITED STATES PATENTS

| | | |
|---|---|---|
| 1,331,151 | Hopkins | Feb. 17, 1920 |
| 1,496,101 | Schmitt | June 3, 1924 |
| 1,600,358 | Puckette | Sept. 21, 1926 |
| 1,814,524 | Nelson | July 14, 1931 |
| 1,986,972 | Hershey | Jan. 8, 1935 |
| 2,098,227 | Chauveau | Nov. 9, 1937 |
| 2,338,872 | Robidoux | Jan. 11, 1944 |
| 2,564,294 | Belcher | Aug. 14, 1951 |